(12) United States Patent
Ravnaas

(10) Patent No.: US 12,078,448 B1
(45) Date of Patent: Sep. 3, 2024

(54) GUN STOCK CORE

(71) Applicant: Brent Ravnaas, Turtle Lake, ND (US)

(72) Inventor: Brent Ravnaas, Turtle Lake, ND (US)

(73) Assignee: Brent Ravnaas, Turtle Lake, ND (US)

( * ) Notice: Subject to any disclaimer, the term of this patent is extended or adjusted under 35 U.S.C. 154(b) by 29 days.

(21) Appl. No.: 18/302,049

(22) Filed: Apr. 18, 2023

(51) Int. Cl.
| | |
|---|---|
| *F41C 23/18* | (2006.01) |
| *B29C 69/02* | (2006.01) |
| *F41C 23/16* | (2006.01) |
| *B29K 75/00* | (2006.01) |
| *B29K 105/04* | (2006.01) |
| *B29K 307/04* | (2006.01) |
| *B29L 31/00* | (2006.01) |

(52) U.S. Cl.
CPC .............. *F41C 23/18* (2013.01); *B29C 69/02* (2013.01); *F41C 23/16* (2013.01); *B29K 2075/00* (2013.01); *B29K 2105/04* (2013.01); *B29K 2307/04* (2013.01); *B29L 2031/777* (2013.01)

(58) Field of Classification Search
CPC ........... F41C 23/16; F41C 23/18; B29C 69/02
See application file for complete search history.

(56) References Cited

U.S. PATENT DOCUMENTS

| | | | | |
|---|---|---|---|---|
| 2,753,642 A | * | 7/1956 | Sullivan .................. | F41C 23/18 264/269 |
| 3,419,454 A | * | 12/1968 | Hoffman ............ | B28B 19/0046 156/303.1 |
| 4,272,309 A | * | 6/1981 | Payne .................... | B29D 30/52 264/225 |
| 6,299,817 B1 | * | 10/2001 | Parkinson ................ | A43B 3/02 264/246 |
| 11,850,811 B1 | * | 12/2023 | Jenkins .............. | G02B 27/0172 |
| 2018/0259293 A1 | * | 9/2018 | Fiester .................. | F41G 11/001 |
| 2020/0049449 A1 | * | 2/2020 | Haase ...................... | F41C 23/10 |
| 2021/0206121 A1 | * | 7/2021 | Willison ................ | B62D 21/09 |
| 2023/0194203 A1 | * | 6/2023 | Roberts ................... | F41C 23/02 42/72 |

FOREIGN PATENT DOCUMENTS

| | | | | | |
|---|---|---|---|---|---|
| GB | | 2222384 A | * | 3/1990 | ........... B29C 33/306 |
| WO | WO-9956942 A1 | | * | 11/1999 | ............. B29C 45/16 |
| WO | WO-2021240024 A1 | | * | 12/2021 | ............. B29C 44/14 |

* cited by examiner

*Primary Examiner* — Bret Hayes
(74) *Attorney, Agent, or Firm* — Taft Stettinius & Holllister LLP

(57) ABSTRACT

Manufacturing a gun stock core using a curable material in a mold that includes a plurality of mold sections wherein each mold section defines a portion of a mold cavity of the mold. A first amount of curable material is poured into the mold cavity portion of the first mold section and cured to form a first portion of the gun stock core. A second amount of curable material is poured into the mold cavity portion of the second mold section, wherein the second mold cavity portion is fluidly connected to the first mold cavity portion to enable a bond to form between the poured material in the first and second mold cavity portions and cured for a predetermined time period to form a second portion of the gun stock core. The finished gun stock core has a variable specific gravity, weight, or strength along a longitudinal length and height.

20 Claims, 5 Drawing Sheets

GUN STOCK CORE

TECHNICAL FIELD

The present application relates generally to a unique technique for manufacturing a gun stock core and a unique gun stock core.

BACKGROUND

A gun stock core has a longitudinal length that often includes a butt or end section, a stock portion, an action section, and a forearm portion. One method of manufacturing the gun stock core includes pouring polyurethane foam material into an outer shell that is typically made of a harder material to contain the polyurethane foam material therein. The poured or placed polyurethane foam material then cures or hardens in the outer shell. One drawback of this technique is that the density placement of the polyurethane foam material cannot be accurately controlled and/or changed along the longitudinal length of the gun stock core when the polyurethane foam material is placed in the outer shell. A constant density along the longitudinal length of the gun stock core is ergonomically more challenging for a user when using or holding the final or cured gun stock core that is not balanced relative to its center of gravity.

Therefore, further contributions in this area of technology are needed to improve the manufacturing techniques and ergonomic features of the gun stock core. Therefore, there remains a significant need for the apparatuses and methods disclosed herein.

SUMMARY

One embodiment includes a unique method of manufacturing a gun stock core having variable properties along the longitudinal length of the gun stock core and within each of a plurality of gun stock portions or sections of the gun stock core. Some of the properties that may vary along the length of the gun stock core and within each of the gun stock sections include strength, density, specific gravity, weight, hardness, to name a few examples however there could be additional properties that vary. The variance in properties between the sections and within each section is beneficial and can be customized as desired for each gun stock core and between additional gun stock cores. For example, a first gun stock portion may be heavier in weight as compared to a second gun stock portion of the same gun stock core to balance the weight relative to the center of gravity of the gun stock core for a user. Another embodiment is a unique gun stock core having higher strength material in certain locations or sections along the longitudinal length of the gun stock core and lower strength material in other locations or sections. The sections that are higher strength may be areas where components such as slings, rails, or bipods are attached thereto whereas the sections that are lower strength may not have any components attached thereto. As another example embodiment, the gun stock core can include variable density and specific gravity along the longitudinal length and/or within each of the sections of the gun stock core.

The unique method of manufacturing the gun stock core is faster than other techniques of manufacturing. For example, the unique method does not require changing tooling to change or vary the properties of the material that is used to form the different sections of the gun stock core. Using the same tooling to manufacture the gun stock core reduces the amount of time needed to manufacture the gun stock core. One embodiment of manufacturing the gun stock core includes mixing urethane and pouring or dispensing a first amount of the urethane into a first portion of the mold to create a first portion of the gun stock core. In addition to urethane, other types of materials can be used to manufacture the gun stock core. Some non-limiting examples include urethane or syntactic foam, wax, acrylic, resin, polymer, polyester, plastic, epoxy, metal, bubbles or spheres made of glass or resin, and/or composite materials that are mixture of these materials or other materials such as silane, beryllium, calcium. Additional amounts and sections of urethane or other similar material are placed adjacent to the first portion wherein each additional section builds or rests against the previous section in the mold. The additional sections of material are placed while the earlier section of material is still wet to enable these additional sections to bond with the earlier sections to form a stronger bond and cure. Alternatively, one or more sections are manufactured from a block of material that is approximately the same size as the one of the plurality of gun stock portions into which the block is placed. The block of material can be machined instead of poured into the mold. Additional material that is poured or placed into portions of the gun stock mold adjacent the block of material.

This summary is provided to introduce a selection of concepts that are further described below in the illustrative embodiments. This summary is not intended to identify essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF ILLUSTRATIVE EMBODIMENTS

Figure 1:
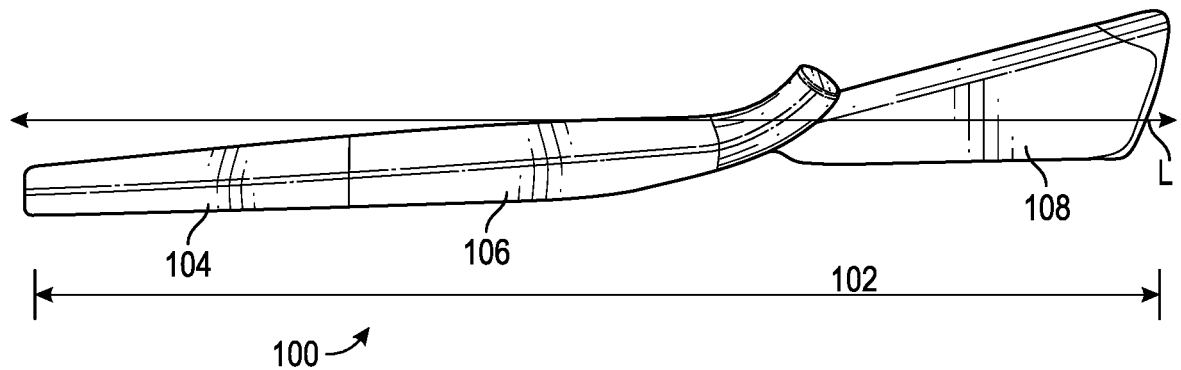
FIG. 1 is a perspective view of a first embodiment of a gun stock core of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
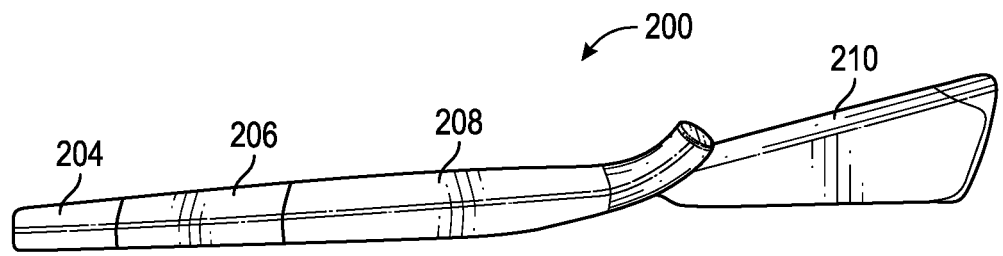
FIG. 2 is a perspective view of a second embodiment of a gun stock core of the present disclosure.
Figure 3:
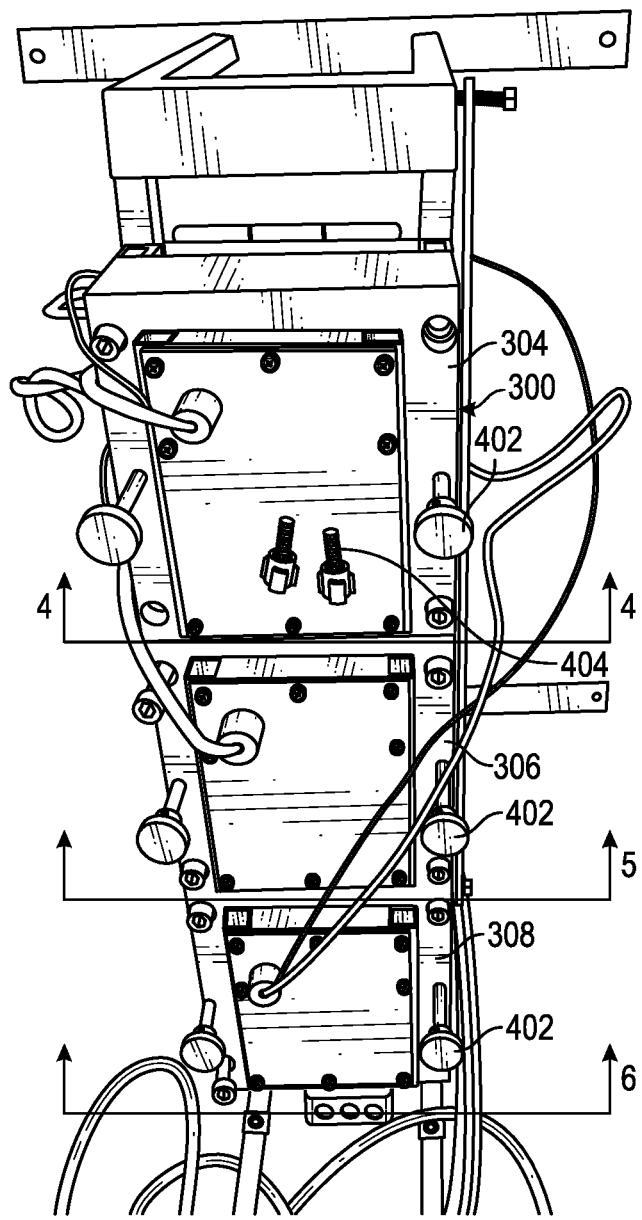
FIG. 3 is a top view of a mold for manufacturing the first and second embodiments of the gun stock core.
Figure 4:
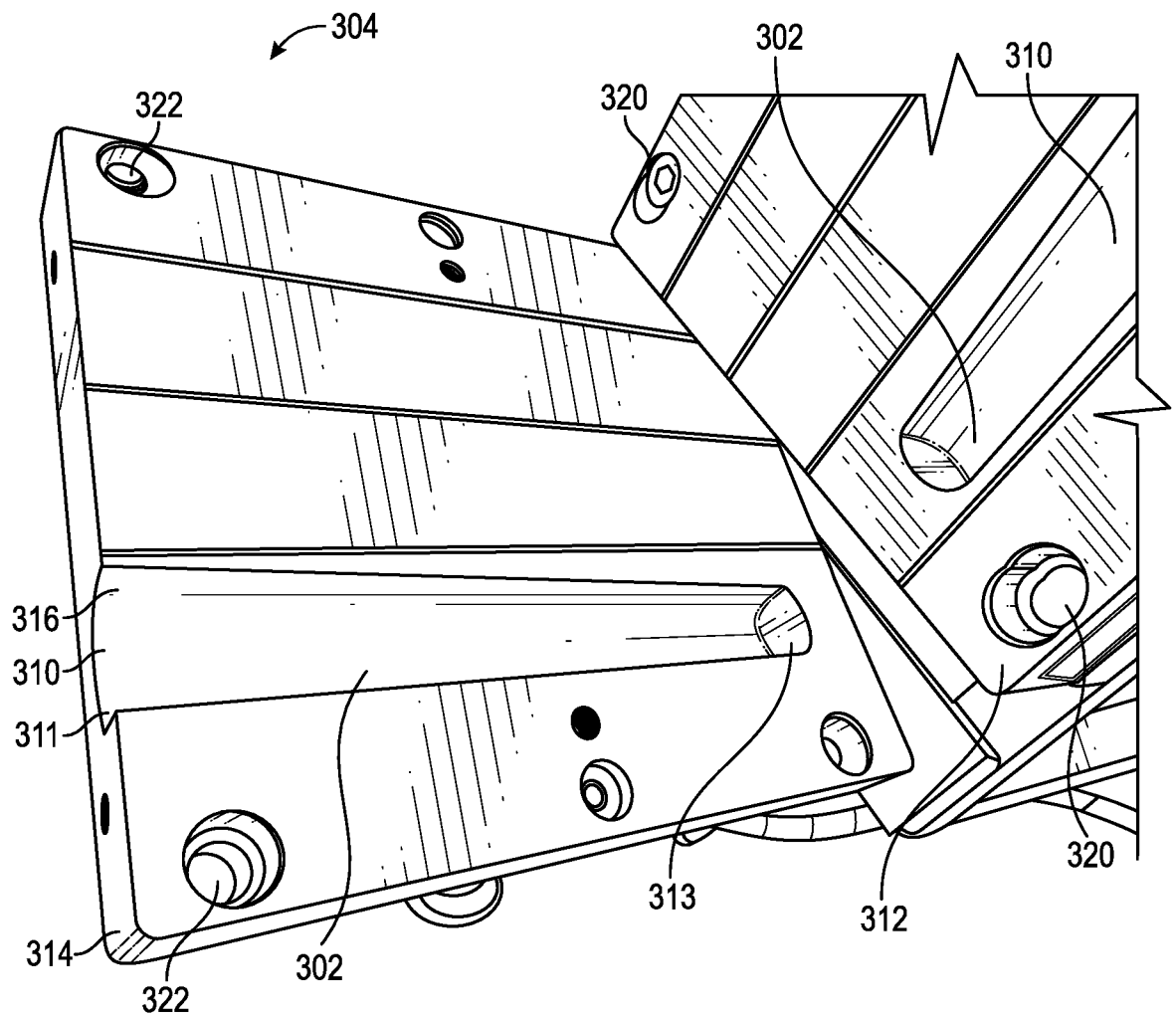
FIG. 4 is a first partial sectional view of the mold from FIG. 3.
Figure 5:
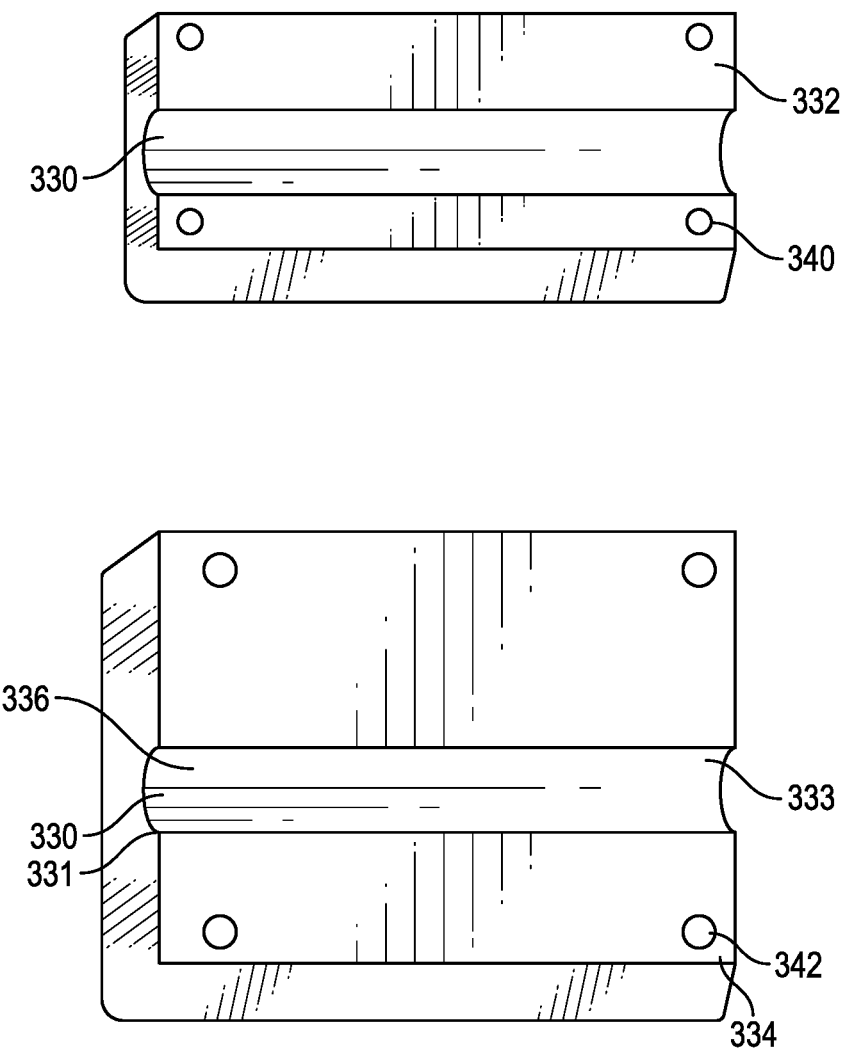
FIG. 5 is a second partial sectional view of the mold from FIG. 3.
Figure 6:
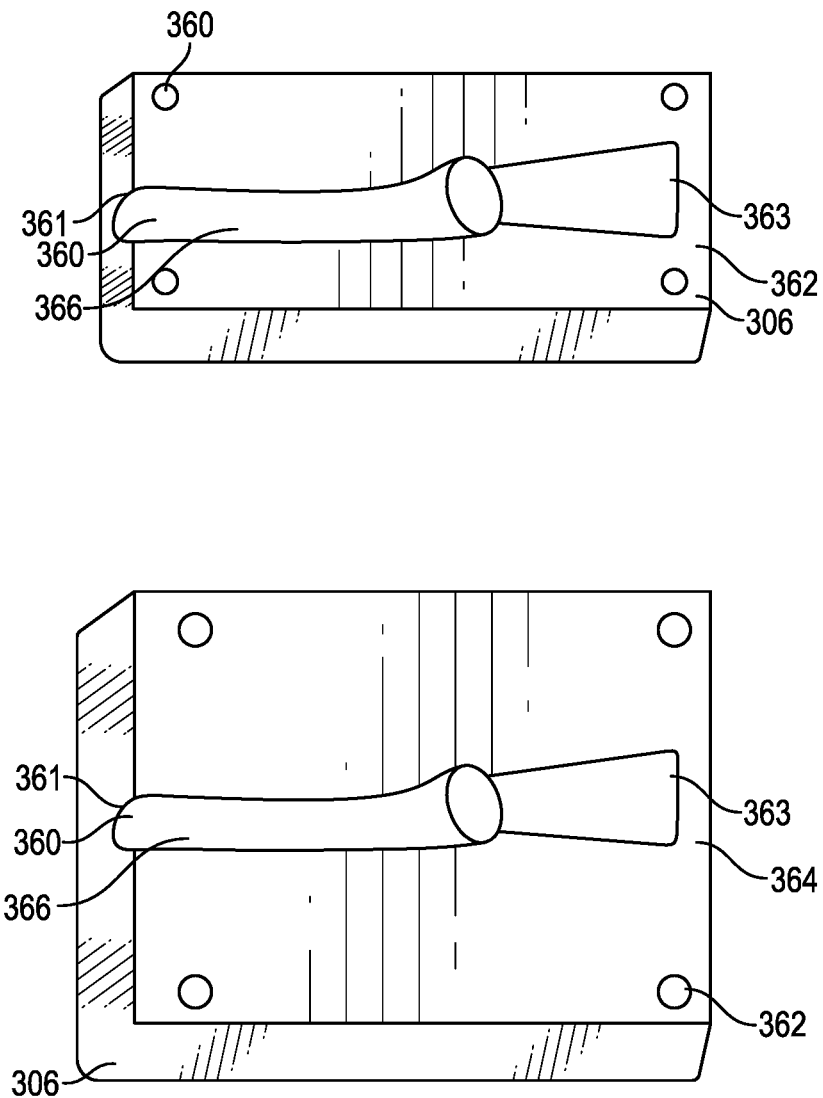
FIG. 6 is a third partial sectional view of the mold from FIG. 3.

Turning now to the present application with reference to FIG. 1, a first embodiment of a gun stock core 100 is illustrated. The gun stock core 100 has a longitudinal length 102 that is measured along a longitudinal axis L of the gun stock core 100. The gun stock core 100 includes a first gun stock portion 104, a second gun stock portion 106, and a third gun stock portion 108 wherein the second gun stock portion 106 is positioned between the first and third gun stock portions 104 and 108. Although the gun stock core 100 includes three sections or portions, in other embodiments the gun stock core 100 can include additional sections or fewer sections. For example, illustrated in FIG. 2, another embodiment of a gun stock core 200 includes a first gun stock portion 204, a second gun stock portion 206, a third gun stock portion 208, and a fourth gun stock portion 210. Each of the first, second, and third gun stock portions 104, 106, and 108 may include additional sections or layers. In the illustrated embodiment, the first gun stock portion 104 corresponds to a forearm portion of a shotgun or rifle and the second gun stock portion 106 corresponds to an action section of the gun. The third gun stock portion 108 corresponds to a stock portion and a butt or end section of the gun.

The gun stock core 100 is manufactured in a mold 300 that is illustrated in FIGS. 3-6. The mold 300 includes a mold cavity 302 that is shaped to match a desired gun stock shape for the gun stock core 100. The mold 300 includes a first mold section 304, a second mold section 306, and a third mold section 308. Each of the first, second, and third mold sections 304, 306, and 308 includes a portion of the mold cavity 302. The first, second, and third mold sections 304, 306, and 308 are similar to each other except that the mold cavity in each section is different and corresponds to a portion of a gun. The mold 300 is made from a durable material. Some examples of durable materials include aluminum, steel, plastic, or other similar material, or combinations of these materials.

The first mold section 304 includes a first mold cavity 310 that is sized to receive a liquid urethane material or other similar material having a first density. The first mold cavity 310 is a first portion of the larger mold cavity 302. The first mold cavity 310 includes a mold cavity surface 316 that spans between a first end 311 and a second end 313. The first mold section 304 includes an upper mold 312 and a lower mold 314 that are collectively configured to define the first mold cavity 310 when the upper and lower molds 312 and 314 are assembled together. In the illustrated embodiment, the upper mold 312 includes a plurality of upper holes 320, and the lower mold 314 includes a plurality of lower holes 322 wherein the plurality of upper and lower holes 320 and 322 are sized and arranged to align with each other when the upper and lower molds 312 and 314 are assembled together. The plurality of upper and lower holes 320 and 322 are configured to receive a fastener such as a bolt 402 or a screw 404 to maintain the upper and lower molds 312 and 314 assembled together. Other types of fasteners or configurations of assembling the upper and lower molds 312 and 314 together are within the scope of this application. One example includes the upper and lower molds 312 and 314 attached together with a hinge along one common side of the upper and lower molds 312 and 314 to enable the upper mold 312 to open away from the lower mold 314.

When the upper and lower molds 312 and 314 are assembled together, the first end 311 is open but can be sealed or covered after urethane, lightweight foam material, or any other material described herein, fills the first mold cavity 310. For example, a temporary cover (not illustrated) can be placed over the first end 311 to seal the material in the first mold cavity 310. The mold cavity surface 316 can include one or more features that impart a textured or patterned outer surface to the liquid urethane material or other similar material that is placed into the first mold cavity 310 to form the first gun stock portion 104 of the gun stock core 100. The first mold cavity 310 and the mold cavity surface 316 are shaped as the first gun stock portion 104 of the desired gun stock shape. The liquid material can be mixed with a curing agent prior to placement in the first mold cavity 310. One example of urethane material includes a two-part system of a polyol and an isocyanate. In other embodiments, a different liquid, resin, foam, lightweight material, or heavyweight material can be introduced into the first mold cavity 310. One example of the curing agent includes silane but other types of curing agents can be used if desired.

In some embodiments, a reinforcing member or a block can be inserted into the first mold cavity 310 prior to the liquid material being introduced in the first mold cavity 310. When the reinforcing member or block is inserted into the first mold cavity 310, the liquid material may only fill a portion of the first mold cavity 310. For example, if the reinforcing member or the block is similarly shaped as the first mold cavity 310 then the liquid material may only fill the portion of the first mold cavity 310 such as near the first end 311 to bond to the liquid material that will be placed in a second mold cavity 330 of the second mold section 306. The liquid material can also be placed near the second end 313 and the reinforcing material can then be positioned in the first mold cavity 310 to thereby bond to the liquid material. As another example, the reinforcing member can include a plurality of reinforcing members that form a skeleton wherein the liquid material covers the skeleton in the first mold cavity 310. The reinforcing member is made of a material that bonds to the liquid material that is inserted in the first mold cavity 310.

In some embodiments, the first mold cavity 310 and the mold cavity surface 316 correspond to a forearm shape of the desired gun stock shape. In the embodiment in which the first gun stock portion 104 has a forearm shape, the density of the liquid urethane material is in the range between 3 pounds/ft$^3$ and 26 pound/ft$^3$ to provide a lightweight section of the gun stock core 100. However, the first mold cavity 310 and the mold cavity surface 316 can correspond to any portion or shape of the desired gun stock core 100 and other densities. In the embodiment of a forearm shape for the first mold cavity 310 and the mold cavity surface 316, the specific gravity of the first gun stock portion 104 of the gun stock core 100 that is cured is between 0.10 and 0.50. The foregoing is provided to give the reader some specific non-limiting examples for some possible implementations of the invention, but the invention is not necessarily limited thereto.

The second mold section 306 is similar to the first mold section 304 except the second mold section 306 is a mold for a different portion of the gun stock core 100 and the second mold section 306 is configured to connect or attach to the first mold section 304. The second mold section 306 includes a second mold cavity 330 that is sized to receive a liquid material or other similar material previously mentioned having a second set of properties that may be different than the material placed in the first mold cavity 310. For example, the second density of the material to be placed in the second mold section 306 may be different from the first density of the material to be placed in the first mold section 304. As another example, the material placed in the second mold section 306 is a heavyweight material, whereas the material placed in the first mold section 304 is a lightweight material. In some embodiments, the material in the first mold section 304 is a heavyweight material and the material in the second mold section 306 is a lightweight material. The second mold cavity 330 is a second portion of the larger mold cavity 302. The second mold cavity 330 includes a mold cavity surface 336 that spans between a first end 331 and a second end 333. The second mold section 306 includes an upper mold 332 and a lower mold 334 that are collectively configured to define the second mold cavity 330 when the upper and lower molds 332 and 334 are assembled together.

In the illustrated embodiment, the upper mold 332 includes a plurality of upper holes 340, and the lower mold 334 includes a plurality of lower holes 342 wherein the plurality of upper and lower holes 340 and 342 are sized and arranged to align with each other when the upper and lower molds 332 and 334 are assembled together. The plurality of upper and lower holes 340 and 342 are configured to receive a fastener such as bolt 402 or screw 404 to maintain the upper and lower molds 332 and 334 assembled together. Other types of fasteners or configurations of assembling the upper and lower molds 332 and 334 together are within the scope of this application. One example includes the upper and lower molds 332 and 334 are attached together with a hinge along one common side of the upper and lower molds 332 and 334 to enable the upper mold 332 to open away from the lower mold 334.

The first and second ends 331 and 333 are open but are sealed or covered with a temporary cover after the urethane or other liquid material fills the second mold cavity 330 when the upper and lower molds 332 and 334 are assembled together. In particular, the second end 333 of the second mold section 306 is assembled with the first end 311 of the first mold section 304 such that the first and second mold cavities 310 and 330, respectively, including the first and second gun stock portions 104 and 106 are connected via the ends 333 and 311. The first end 331 remains open to receive the liquid material and thereafter the temporary cover to seal the first end 331.

The second mold cavity 330 has a mold cavity surface 336 that can include one or more features that impart a textured or patterned outer surface to the gun stock core 100. The liquid or urethane material can be mixed with a curing agent prior to placement in the second mold cavity 330 to form the second gun stock portion 106 of the desired gun stock shape. In other embodiments, a different liquid, resin, or foam material can be introduced into the second mold cavity 330 to cure or harden thereafter.

In some embodiments, a reinforcing member or block can be inserted into the second mold cavity 330 prior to the liquid or urethane material being positioned in the second mold cavity 330. The reinforcing member or block was previously described above. One of the benefits of the block is there is no need to wait additional time for curing as the block is the appropriate configuration and strength. In one form, the block has the shape of the action section of the gun stock core 100. When the block or reinforcing member is inserted into the second mold cavity 330, the liquid or urethane material may only fill a portion of the second mold cavity 330. For example, the liquid or urethane material may only fill the portion near the first end 331 or the liquid or urethane material may only fill the portion near the second end 333.

The second mold cavity 330 is fluidly connected to the first mold cavity 310 to enable a bond to form between the poured material in the second and first mold sections 306 and 304. In some embodiments, the second mold cavity 330 and the mold cavity surface 336 correspond to an action section of the desired gun stock shape. When the second gun stock portion 106 corresponds to the action section, the second density of the liquid or urethane material is typically in the range between 3 pounds/ft$^3$ and 26 pounds/ft$^3$ but can have an alternative density. The foregoing is provided to give the reader some specific non-limiting examples for some possible implementations of the invention, but the invention is not necessarily limited thereto.

The third mold section 308 is similar to the first mold section 304 except the third mold section 308 is a mold for a different portion of the gun stock core 100 and the third mold section 308 is configured to connect or attach to the second mold section 306. The third mold section 308 includes a third mold cavity 360 that is sized to receive a liquid or urethane material or other similar material. The liquid material placed in the third mold cavity 360 can have the same, similar, of different properties as the liquid material placed in the first or second mold cavities 310 and 330. For example, the liquid material placed in the third mold cavity 360 can have a third specific gravity which can be different from the first or second specific gravities of the liquid material placed in the first or second mold cavities 310 and 330. The third mold cavity 360 has a mold cavity surface 366 that spans between a first end 361 opposite a second end 363. The mold cavity surface 366 can include one or more features that impart a textured or patterned outer surface to the third gun stock portion 108 of the gun stock core 100. The third mold cavity 360 and the mold cavity surface 366 are shaped as a portion of the desired gun stock shape.

The third mold section 308 includes an upper mold 362 and a lower mold 364 that are collectively configured to define the third mold cavity 360 when the upper and lower molds 362 and 364 are assembled together. In the illustrated embodiment, the upper mold 362 includes a plurality of upper holes 360, and the lower mold 364 includes a plurality of lower holes 362 wherein the plurality of upper and lower holes 360 and 362 are sized and arranged to align with each other when the upper and lower molds 362 and 364 are assembled together. The plurality of upper and lower holes 360 and 362 are configured to receive a fastener such as bolt 402 or screw 404 to maintain the upper and lower molds 362 and 364 assembled together. Other types of fasteners or configurations of assembling the upper and lower molds 362 and 364 together are within the scope of this application. One example includes the upper and lower molds 362 and 364 are attached together with a hinge along one common side of the upper and lower molds 362 and 364 to enable the upper mold 362 to open away from the lower mold 364.

The first end 361 is open but will be sealed or covered after the liquid or urethane material fills the third mold cavity 360 when the upper and lower molds 362 and 364 are assembled together. The liquid or urethane material can be mixed with a curing agent prior to placement in the third mold cavity 360. In other embodiments, a different liquid material can be introduced into the third mold cavity 360. In some embodiments, a reinforcing member can be inserted into the third mold cavity 360 prior to the liquid or urethane material being positioned in the third mold cavity 360. When a reinforcing member is inserted into the third mold cavity 360, the liquid or urethane material may only fill a portion of the third mold cavity 360. For example, the liquid or urethane material may only fill the portion near the second end 363 or only the portion near the first end 361. The third mold cavity 360 is fluidly connected to the second mold cavity 330 to enable a bond to form between the poured or placed material in the third and second mold sections 308 and 306. In some embodiments, the third mold cavity 360 and the mold cavity surface 366 correspond to a butt section of the desired gun stock shape. When the third gun stock portion 108 is the shape of the butt section and is made of urethane material, the third specific gravity of the liquid urethane material is in the range between 0.1 and 0.5. The foregoing is provided to give the reader some specific non-limiting examples for some possible implementations of the invention, but the invention is not necessarily limited thereto.

A method of manufacturing a gun stock core 100 using urethane or other liquid material will now be described. The first mold section 304 and the first mold cavity 310 are prepared to receive liquid material that cures or hardens over a period of time. In one embodiment, a release agent is applied to the mold cavity surface 316 that spans between the first end 311 and the second end 313 of the upper and lower molds 312 and 314, respectively. In other embodiments, no release agent is applied to the mold cavity surface 316. One type of release agent includes a silicone spray. Optionally, a predetermined amount of urethane or other liquid material is mixed with a curing agent and then a portion of the mixture is introduced or poured into the first mold cavity 310 of the lower mold 314 of the first mold section 304. The upper mold 312 is positioned on the lower mold 314 and attached thereto with one or more fasteners 402 and 404 prior to or after the mixture is introduced into the first mold cavity 310. In some embodiments, a reinforcing member is inserted into the first mold cavity 310 prior to curing the mixture and/or prior to introducing the mixture material. The first end 311 is sealed with a temporary cover while the mixture in the first mold cavity 310 cures for a predetermined time period to form the first gun stock portion 104 of the gun stock core 100.

In one embodiment, a release agent is applied to the mold cavity surface 336 that spans between the first end 331 and the second end 333 of the upper and lower molds 332 and 334, respectively. In other embodiments, no release agent is applied to the mold cavity surface 336. Optionally, a predetermined amount of urethane or other similar material is mixed with a curing agent and then a portion of the mixture is introduced or poured into the second mold cavity 330 of the lower mold 334 of the second mold section 304. In other embodiments, no curing agents are mixed with the urethane or liquid material. The liquid material that is introduced into the second mold cavity 330 has a second set of properties that may be the same as the first set of properties of the liquid material placed in the first mold cavity 310. Optionally, the second specific gravity is higher than the first specific gravity in other embodiments. The upper mold 332 is positioned on the lower mold 334 and assembled together with one or more fasteners 402 and 404. The mixture is introduced into the second mold cavity 330 via the first end 331. The second mold cavity 330 is fluidly connected to the first mold cavity 310 to enable a bond to form between the poured material in the first and second mold cavities 310 and 330. In particular, the bond occurs at the first end 311 of the first mold cavity 310 and the second end 333 of the second mold cavity 330. The mixture in the second cavity 330 is allowed to cure for a predetermined time period to form the second gun stock portion 106 of the gun stock core 100. The first end 331 is sealed while the mixture in the second cavity 330 cures for a predetermined time period to form the second gun stock portion 106 of the gun stock core 100. In some embodiments, the reinforcing member is a block shape and is positioned in the second mold cavity 330.

In one embodiment, a release agent is applied to the mold cavity surface 366 that spans between the first end 361 and the second end 363 of the upper and lower molds 362 and 364, respectively. In other embodiments, no release agent is applied to the mold cavity surface 366. Optionally, a predetermined amount of urethane or other liquid material is mixed with a curing agent and then a portion of the mixture is introduced or poured into the third mold cavity 360 of the lower mold 364 of the third mold section 306. In other embodiments, no curing agents are mixed with the urethane or similar material. The urethane or liquid material that is introduced into the third mold cavity 360 has a third set of properties that may be the same as the first and/or second set of properties of the liquid material placed in the first and/or second mold cavities 310 and/or 330. Optionally, the third density or specific gravity is higher than the first and second densities or specific gravities in other embodiments. The upper mold 362 is positioned on the lower mold 364. Next, a portion of the mixture is poured or introduced into the third mold cavity 360 of the third mold section 306. The third mold cavity 360 is fluidly connected to the second mold cavity 330 to enable a bond to form between the poured or placed material in the second and third mold cavities 330 and 360. In particular, the bond occurs at the first end 361 of the third mold cavity 360 and the first end 331 of the second mold cavity 330. The mixture portion in the third cavity 360 is allowed to cure for a predetermined time period to form the third gun stock portion 108 of the gun stock core 100.

Lastly, the gun stock core 100 is removed from the mold 300. In one embodiment, the urethane material in the gun stock core 100 has a Shore D hardness in the range of 70 to 90 wherein the Shore D hardness in each of the first, second, and third mold sections 306 can vary as desired for varying the strength of each of the sections and/or attachments.

The first gun stock portion 104, the second gun stock portion 106, and the third gun stock portion 108 can have variable strength, density, specific gravity, and weight after each of the portions are cured. As can be appreciated the strength, density, specific gravity, and weight can vary along the longitudinal length of the gun stock core 100 and along the longitudinal length of each of the first, second, and third gun stock portions 104, 106, and 108.

In some embodiments, the gun stock core 100 can be a component of a firearm stock assembly. The firearm stock assembly comprises the gun stock core 100 and a finish material applied to the gun stock core 100 to create a finished gun stock.

In one embodiment, a resin transfer molding process is used for the gun stock 100. The resin transfer molding process includes carbon fiber material applied to an exterior surface of the gun stock core 100. The gun stock core 100 is placed in a shell mold sized to receive the gun stock core 100 and the carbon fiber material. A resin material is introduced into the shell mold to cover the gun stock core 100 and the carbon fiber material. The resin material cures within the shell mold.

In some embodiments, a barrel, a trigger, one or more rails, and/or a magazine can be mounted or attached to the gun stock core 100.

As is evident from the figures and text presented above, a variety of aspects of the present disclosure are contemplated.

Various aspects of the present application are contemplated. According to one aspect, a method for manufacturing a gun stock core, comprising the steps of: providing a mold with a mold cavity shaped to match the desired gun stock shape, the mold including a plurality of mold sections wherein each mold section defines a portion of the mold cavity; introducing a liquid material having a first set of properties into a first portion of the mold cavity of the first mold section; curing the liquid material within the first portion of the mold cavity for a time period to form a first gun stock portion of the gun stock core; introducing additional liquid material having a second set of properties into a second portion of the mold cavity of the second mold section, the second portion of the mold cavity is fluidly connected to the first portion of the mold cavity to enable a bond to form between the introduced material in the first and second mold sections, the second set of properties being different than the first set of properties; curing the additional liquid material within the second portion of the mold cavity for a time period to form a second gun stock portion of the gun stock core, wherein the second gun stock portion is bonded to the first gun stock portion; and removing the gun stock core from the mold.

In one embodiment, wherein the first set of properties includes specific gravity being higher than specific gravity of the second set of properties.

In one embodiment, wherein each of the plurality of mold sections includes an upper mold and a lower mold collectively configured to define the corresponding portion of the mold cavity.

In one embodiment, wherein the mold cavity includes features that impart a textured or patterned outer surface to the gun stock core.

In one embodiment, further comprising: inserting a reinforcing member into either the first or second portions of the mold cavity of the first or second mold sections prior to introducing the liquid material into that corresponding portion.

In one embodiment, further comprising: introducing additional liquid material having a third set of properties into a third portion of the mold cavity of the third mold section, the third portion of the mold cavity being fluidly connected to the second portion of the mold cavity to enable a bond to form between the poured material in the third and second mold sections; and curing the additional liquid material within the third portion of the mold cavity for a time period to form a third gun stock portion of the gun stock core, wherein the third gun stock portion is bonded to the second gun stock portion.

In one embodiment, further comprising: applying carbon fiber material on an exterior surface of the gun stock core; placing the gun stock core in a shell mold sized to receive the gun stock core and the carbon fiber material; introducing a resin material into the shell mold to cover the gun stock core and the carbon fiber material; and curing the resin material within the shell mold.

In one embodiment, a gun stock core made from a cured urethane material, formed by the method above.

In one embodiment, wherein the liquid material and the additional liquid material includes urethane material.

In one embodiment, wherein the first gun stock portion of the gun stock core corresponds to a forearm of the desired gun stock shape.

According to another aspect, a method of manufacturing a gun stock core using liquid material, comprising the steps of: preparing a mold with a mold cavity shaped to match the desired gun stock shape, the mold including a plurality of mold sections wherein each mold section defines a portion of the mold cavity; applying a release agent to a mold surface of the mold cavity; mixing a predetermined amount of liquid material with a curing agent; pouring a first portion of the mixture into the mold cavity portion of the first mold section; allowing the first portion of the mixture to cure for a predetermined time period to form a first gun stock portion of the gun stock core; pouring a second portion of the mixture into the mold cavity portion of the second mold section, wherein the second mold cavity portion is fluidly connected to the first mold cavity portion to enable a bond to form between the poured material in the first and second mold cavity portions; allowing the second mixture portion to cure for a predetermined time period to form a second gun stock portion of the gun stock core; and removing the gun stock core from the mold.

In one embodiment, wherein the first gun stock portion of the gun stock core has a first set of properties, and the second gun stock portion of the gun stock core has a second set of properties that are different than the first set of properties.

In one embodiment, wherein the first and second mold sections each include an upper mold and a lower mold collectively configured to define the corresponding portion of the mold cavity.

In one embodiment, wherein the mold cavity includes features that impart a textured or patterned outer surface to the gun stock core.

In one embodiment, further comprising: inserting a reinforcing member into either the first or second portions of the mold cavity of the first or second mold sections prior to pouring the mixture into that corresponding portion.

In one embodiment, further comprising: introducing additional mixture material into a third mold cavity portion of a third mold section, the third mold cavity portion being fluidly connected to the second mold cavity portion of the mold cavity to enable a bond to form between the poured material in the third and second mold cavity portions; and curing the additional mixture material within the third mold cavity portion for a time period to form a third gun stock portion of the gun stock core, wherein the third gun stock portion is bonded to the second gun stock portion.

In one embodiment, wherein the liquid material and the additional liquid material includes urethane material.

In one embodiment, further comprising: applying carbon fiber material on an exterior surface of the gun stock core; placing the gun stock core in a shell mold sized to receive the gun stock core and the carbon fiber material; introducing a resin material into the shell mold to cover the gun stock core and the carbon fiber material; and curing the resin material within the shell mold.

In one embodiment, a gun stock core made from a cured urethane material, formed by the method above, wherein the urethane material has a Shore D hardness in the range of 70 to 90.

In one embodiment, wherein the first gun stock portion of the gun stock core corresponds to a forearm of the desired gun stock shape.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventor to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for manufacturing a gun stock core, comprising the steps of:
   providing a mold with a mold cavity shaped to match a desired gun stock shape, the mold including a plurality of mold sections wherein each mold section defines a portion of the mold cavity;
   introducing a liquid material having a first set of properties into a first portion of the mold cavity of the first mold section;
   curing the liquid material within the first portion of the mold cavity for a time period to form a first gun stock portion of the gun stock core;
   introducing additional liquid material having a second set of properties into a second portion of the mold cavity of the second mold section, the second portion of the mold cavity is fluidly connected to the first portion of the mold cavity to enable a bond to form between the introduced material in the first and second mold sections, the second set of properties being different than the first set of properties;
   curing the additional liquid material within the second portion of the mold cavity for a time period to form a second gun stock portion of the gun stock core, wherein the second gun stock portion is bonded to the first gun stock portion; and
   removing the gun stock core from the mold.

2. The method of claim 1, wherein the first set of properties includes specific gravity being higher than specific gravity of the second set of properties.

3. The method of claim 1, wherein each of the plurality of mold sections includes an upper mold and a lower mold collectively configured to define the corresponding portion of the mold cavity.

4. The method of claim 1, wherein the mold cavity includes features that impart a textured or patterned outer surface to the gun stock core.

5. The method of claim 1, further comprising:
   inserting a reinforcing member into either the first or second portions of the mold cavity of the first or second mold sections prior to introducing the liquid material into that corresponding portion.

6. The method of claim 1, further comprising:
   introducing additional liquid material having a third set of properties into a third portion of the mold cavity of the third mold section, the third portion of the mold cavity being fluidly connected to the second portion of the mold cavity to enable a bond to form between the poured material in the third and second mold sections; and
   curing the additional liquid material within the third portion of the mold cavity for a time period to form a third gun stock portion of the gun stock core, wherein the third gun stock portion is bonded to the second gun stock portion.

7. The method of claim 1, further comprising:
   applying carbon fiber material on an exterior surface of the gun stock core;
   placing the gun stock core in a shell mold sized to receive the gun stock core and the carbon fiber material;
   introducing a resin material into the shell mold to cover the gun stock core and the carbon fiber material; and
   curing the resin material within the shell mold.

8. A gun stock core made from a cured urethane material, formed by the method of claim 1.

9. The method of claim 1, wherein the liquid material and the additional liquid material includes urethane material.

10. The method of claim 1, wherein the first gun stock portion of the gun stock core corresponds to a forearm of the desired gun stock shape.

11. A method of manufacturing a gun stock core using liquid material, comprising the steps of:
   preparing a mold with a mold cavity shaped to match a desired gun stock shape, the mold including a plurality of mold sections wherein each mold section defines a portion of the mold cavity;
   applying a release agent to a mold surface of the mold cavity;
   mixing a predetermined amount of liquid material with a curing agent;
   pouring a first portion of the mixture into the mold cavity portion of the first mold section;
   allowing the first portion of the mixture to cure for a predetermined time period to form a first gun stock portion of the gun stock core;

pouring a second portion of the mixture into the mold cavity portion of the second mold section, wherein the second mold cavity portion is fluidly connected to the first mold cavity portion to enable a bond to form between the poured material in the first and second mold cavity portions;

allowing the second mixture portion to cure for a predetermined time period to form a second gun stock portion of the gun stock core; and removing the gun stock core from the mold.

12. The method of claim 11, wherein the first gun stock portion of the gun stock core has a first set of properties, and the second gun stock portion of the gun stock core has a second set of properties that are different than the first set of properties.

13. The method of claim 11, wherein the first and second mold sections each include an upper mold and a lower mold collectively configured to define the corresponding portion of the mold cavity.

14. The method of claim 11, wherein the mold cavity includes features that impart a textured or patterned outer surface to the gun stock core.

15. The method of claim 11, further comprising:
inserting a reinforcing member into either the first or second portions of the mold cavity of the first or second mold sections prior to pouring the mixture into that corresponding portion.

16. The method of claim 11, further comprising:
introducing additional mixture material into a third mold cavity portion of a third mold section, the third mold cavity portion being fluidly connected to the second mold cavity portion of the mold cavity to enable a bond to form between the poured material in the third and second mold cavity portions; and curing the additional mixture material within the third mold cavity portion for a time period to form a third gun stock portion of the gun stock core, wherein the third gun stock portion is bonded to the second gun stock portion.

17. The method of claim 16, wherein the liquid material and the additional liquid material includes urethane material.

18. The method of claim 11, further comprising:
applying carbon fiber material on an exterior surface of the gun stock core;

placing the gun stock core in a shell mold sized to receive the gun stock core and the carbon fiber material;

introducing a resin material into the shell mold to cover the gun stock core and the carbon fiber material; and curing the resin material within the shell mold.

19. The gun stock core of claim 18, wherein the first gun stock portion of the gun stock core corresponds to a forearm of the desired gun stock shape.

20. A gun stock core made from a cured urethane material, formed by the method of claim 11, wherein the urethane material has a Shore D hardness in the range of 70 to 90.

* * * * *